(12) United States Patent
Tamura et al.

(10) Patent No.: US 6,236,796 B1
(45) Date of Patent: May 22, 2001

(54) COMPACT ELECTRONIC APPARATUS INCLUDING INDIVIDUAL UNITS EACH HAVING SINGLE FUNCTION

(75) Inventors: Tetsuya Tamura; Jun Fujimoto; Masashi Tani; Tomoya Terasawa; Nobuhiro Iwano, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/124,066

(22) Filed: Jul. 29, 1998

(30) Foreign Application Priority Data

Jul. 29, 1997 (JP) .................................................. 9-203119

(51) Int. Cl.[7] .............................. G02B 6/36; H02B 1/30
(52) U.S. Cl. .......................... 385/135; 385/134; 361/600
(58) Field of Search .................................. 385/134, 135; 395/200.53, 200.3; 361/600

(56) References Cited

U.S. PATENT DOCUMENTS

| 4,102,554 | * | 7/1978 | Reimer | 312/223.1 |
| 5,852,545 | * | 12/1998 | Pan-Ratzlaff | 361/683 |
| 5,913,034 | * | 6/1999 | Malcolm | 395/200.53 |

FOREIGN PATENT DOCUMENTS

| 57-104586 | 6/1982 | (JP) . | |
| 57-210699 | 12/1982 | (JP) . | |
| 62-152557 | 9/1987 | (JP) . | |
| 2-195979 | 8/1990 | (JP) | A63H/33/08 |
| 3-30007 | 2/1991 | (JP) . | |
| 4-169761 | 6/1992 | (JP) | F25B/41/00 |
| 6-110579 | 4/1994 | (JP) . | |
| 6-291471 | 10/1994 | (JP) | H05K/5/02 |
| 7-21428 | 1/1995 | (JP) . | |

OTHER PUBLICATIONS

Resnick et al. "Programmable Bricks: Toys to Think With", IBM Systems Journal, vol. 35, No. 3 & 4, http://www.research.ibm.com/journal/sj/mit/sectionc/martin.html, Apr. 1996.*

"M1003 Torbot", http://www.legomindstorms.com/tipstricks/inventions/invent_torbot.html. (No Date).*

"The Programmable Brick FAQ", http://el.www.media.mit.edu/groups/el/projects/programmable–brick/more.html. (No Date).*

"The LEGO Mindstorms Robotics Invention System", http://www.legomindstorms.com/products/whatis/ris.asp. (No Date).*

* cited by examiner

Primary Examiner—John D. Lee
(74) Attorney, Agent, or Firm—Foley & Lardner

(57) ABSTRACT

In a compact, electronic apparatus, a plurality of units are provided. Each of the units has a single function and has a functional component secured to a cabinet.

7 Claims, 14 Drawing Sheets

COMPACT ELECTRONIC APPARATUS INCLUDING INDIVIDUAL UNITS EACH HAVING SINGLE FUNCTION

BACKGROUND OF THE INVENTION

1. Field of the Invention

The present invention relates to a compact electronic apparatus including a plurality of circuit boards mounted with circuit components and various functional components such as a cathode ray tube (CRT), a liquid crystal display (LCD) unit, an audio/video drive and a hard disc drive contained in a metal or synthetic resin cabinet and adapted to be driven by a commercial power supply.

2. Description of the Related Art

Prior art compact electronic apparatuses for daily personal use include television sets, video recorders, personal computers, radio receiving sets, video cameras, stereophonic audio systems, portable cassette players and portable compact disc (CD) players. For example, a personal computer includes a circuit board mounted with a control unit formed by a central processing unit (CPU), a read-only memory (ROM), a random access memory (RAM), etc., and various functional components such as a floppy disc drive, a hard disc drive, a CD-ROM drive, a power supply unit, an amplifier, and extension cage for accommodating an extension board, a CRT monitor, an LCD unit and a loudspeaker. In most conventional personal computers, these functional components are mounted on a single base frame or a single cabinet. Screws, bolts and nuts, snap fit connectors, adhesives and other various mechanical connectors that are different in profile, size and material are used to physically link the components. Also, various electric connectors are used for electrically connecting related components.

On the other hand, a stereophonic audio system typically includes functional components such as a power supply unit, an amplifier, a radio tuner, a television tuner, a CD player, a mini disc (MD) player, a tape player and loudspeakers. In the case of a so-called component type stereophonic audio system, these functional components are mounted on respective base frames or cabinets to form units. The physical linkage of the functional components may be realized by simply laying the units one by one or by placing them in position in a system rack and securing them by mechanical connecting means such as screws. Common connectors are used to electrically connect the units.

Car audio systems also employ a mounting technique similar to the one used for component type stereophonic audio systems.

In the case of a unitary type stereophonic audio system, functional components are mounted on a single base frame or a cabinet like a unitary type personal computer. Like a unitary type personal computer, screws, bolts and nuts, snap fit connectors that are different in profile, size and material are used to physically link the components. Also, various electric connectors are used for electrically connecting the related components.

Now, of various conventional compact electronic apparatuses, personal computers may be subjected to various operations of installing one or more than one additional circuit components on the circuit board or the extension cage and/or one or more than one additional drives for driving a storage medium and replacing some of the circuit components with revised ones in order to modify the operating environment of the computer to adapt it to the installed application software or the various devices connected to the computer depending, of course, on the application software or the devices in question. In order to cope with the above-mentioned situations, various arrangements have been developled.

In a first prior art personal computer, the screws connecting the cabinet to the base frame may be so designed that they can be unscrewed by means of a coin without requiring the use of a specific tool. A unit may be provided for the extension cage so that an additional circuit board may be installed in the computer main body by simply removing the lid of an insertion slot without dismantling the cabinet.

A second prior art personal computer can optionally contain a pack unit as a module to be connected to the circuit of the computer (see JP-A-3-30007).

In a third prior art personal computer, a plurality of circuit boards are arranged on a one on the other basis and a space is provided for receiving additional circuit components in the future so that additional circuit components may be installed and any of the existing circuit components may be replaced without removing the circuit board unit from the cabinet and disassambling the circuit board unit (see JP-A-6-110579).

In a fourth prior art personal computer, functional components are provided so that many units may be connected by means of common connectors without using specific tools to improve the service life of the equipment and make it to be easily disassambled and disposed when it is discarded as waste (see JP-A-7-21428).

Thus, the functional components mounted on today's compact electronic apparatuses such as personal computers, stereophonic audio system, television sets and video recorders are physically and electrically connected in a manner specific to each type of product. However, person computers, stereophonic audio systems, television sets, video recorders, video cameras and car audio systems have many functional components that can be commonly used in those apparatuses. For example, a CD player used in a stereophonic audio system may also be used in a car audio system, a car navigation system, a portable CD player or a personal computer. An LCD monitor may be used in a television set, a video camera, a personal computer, a car television set or a car navigation system. A power supply unit or a loudspeaker may find even broader applications including television sets, video recorders, personal computers, radio receiving sets, stereophonic audio systems, car audio systems, portable cassette players and portable CD players.

However, while many of these electric components in various compact electric apparatuses may not be used simultaneously by a single user, none of them is adapted to be removed from an apparatus, put into another apparatus and electrically connected to the remaining components of the latter apparatus. Therefore, unless identical functional components are minimized in an attempt to protect the environment of this planet, the amount of waste originating from them will be enormous as a whole and put a heavy load on the environment. Note that a wireless remote controller is realized by separating the functions common to different home appliances and those not common to them and combining a plurality of units that can be connected with each other (see JP-U-62-152557). However, this controller is effective only for remote controllers and cannot dissolve the load on the environment that is attributable to home appliances.

In the case of the above-described prior art personal computers or prior art unitary type stereophonic audio systems where all the circuit boards, the circuit components and drives are arranged on a single base frame, physically and electrically connected and housed in a single cabinet, the cabinet has to be removed and many of the complicatedly connected components have to be separated from each other at the cost of tremendous labor when replacing a malfunctioning circuit component, a circuit board or a drive has to be replaced or when the entire apparatus is discarded for waste disposal. Sometimes, circuit boards and components that operate well may also be replaced and disposed of which increases the amount of waste and shortens the service life of the personal computers or stereophonic audio systems.

SUMMARY OF THE INVENTION

It is an object of the present invention to provide a compact electronic apparatus including a minimal number of functional components that allows, whenever necessary, to additionally install functional components and/or replace some of the components with revised ones without removing the cabinet by means of specific tools and disassembling any of the circuit boards and the components so that the apparatus may enjoy a prolonged service life and can be disassembled and subject to waste disposal, when the time comes.

According to the present invention, in a compact electronic apparatus, a plurality of units are provided. Each of the units has a single function and has a functional component secured to a cabinet.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Figure 1:
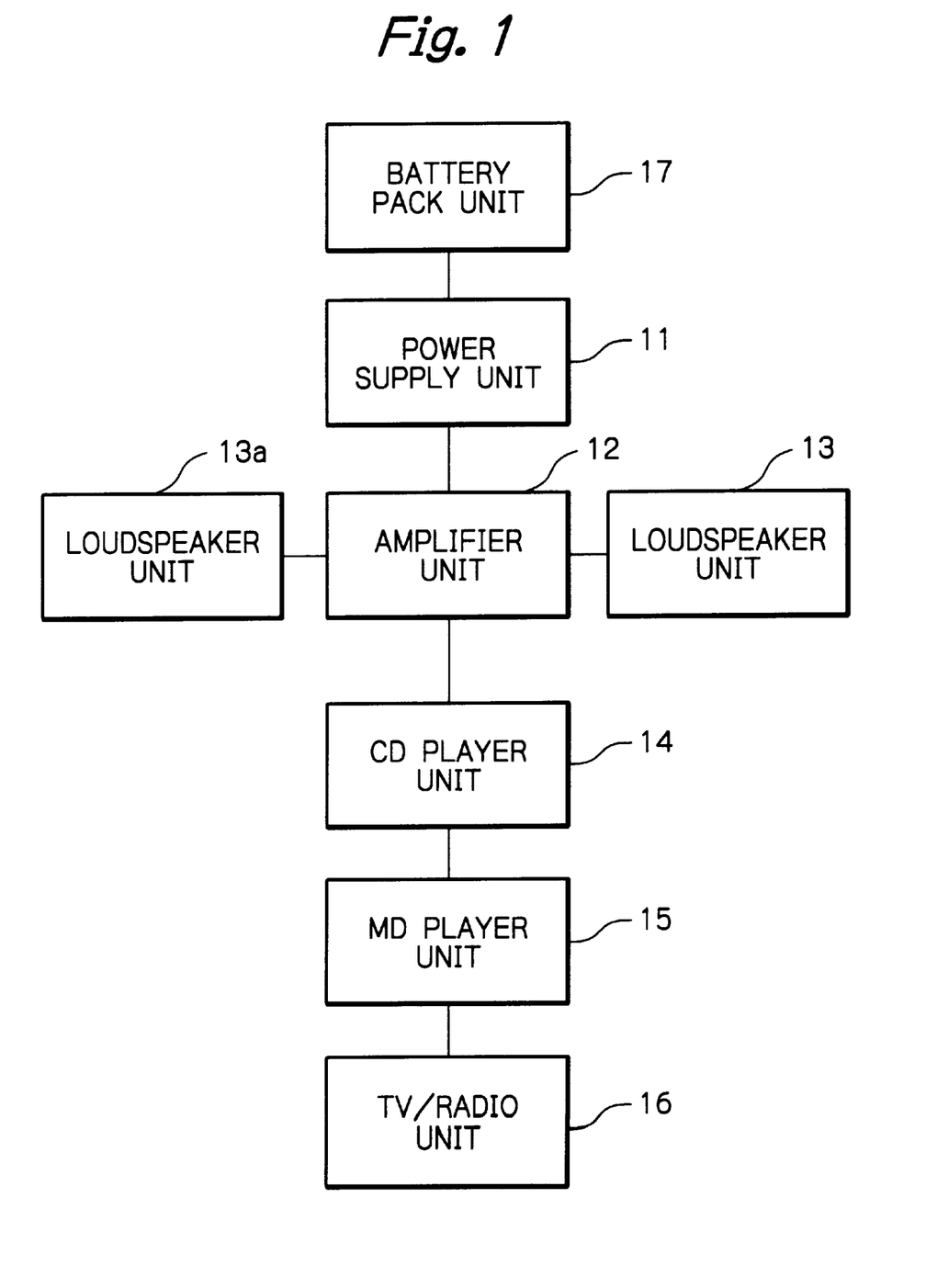
FIG. 1 is a block circuit diagram illustrating a first embodiment of the compact electronic apparatus according to the present invention.

In FIG. 1, which illustrates a first embodiment of the present invention, a stereophonic audio system is illustrated. The stereophonic audio system of FIG. 1 includes a power supply unit 11, and amplifier unit 12, loudspeaker units 13a and 13b, a CD player unit 14, an MD player unit 15, a television (TV)/radio tuner unit 16 and a battery pack unit 17. The CD player unit 14 can be used as a CD-ROM player that can be used in a personal computer. The MD player unit 15 can be used as an MD drive of a personal computer. Since the stereophonic audio system of FIG. 1 mostly used the amplifier unit 12 and the loudspeaker units 13a and 13b at the same time, they are combined into one unit. Each of the units except the power supply unit 11 is provided with a pair of power supply connectors for carrying out a function. All the units except the power supply unit 11 are designed so as to be driven by a DC voltage of 12 V. The power supply unit 11 can transform 100 V of the commercial power supply voltage into 12 V and transmit up to 120 W to each of the units.

Figure 2A:
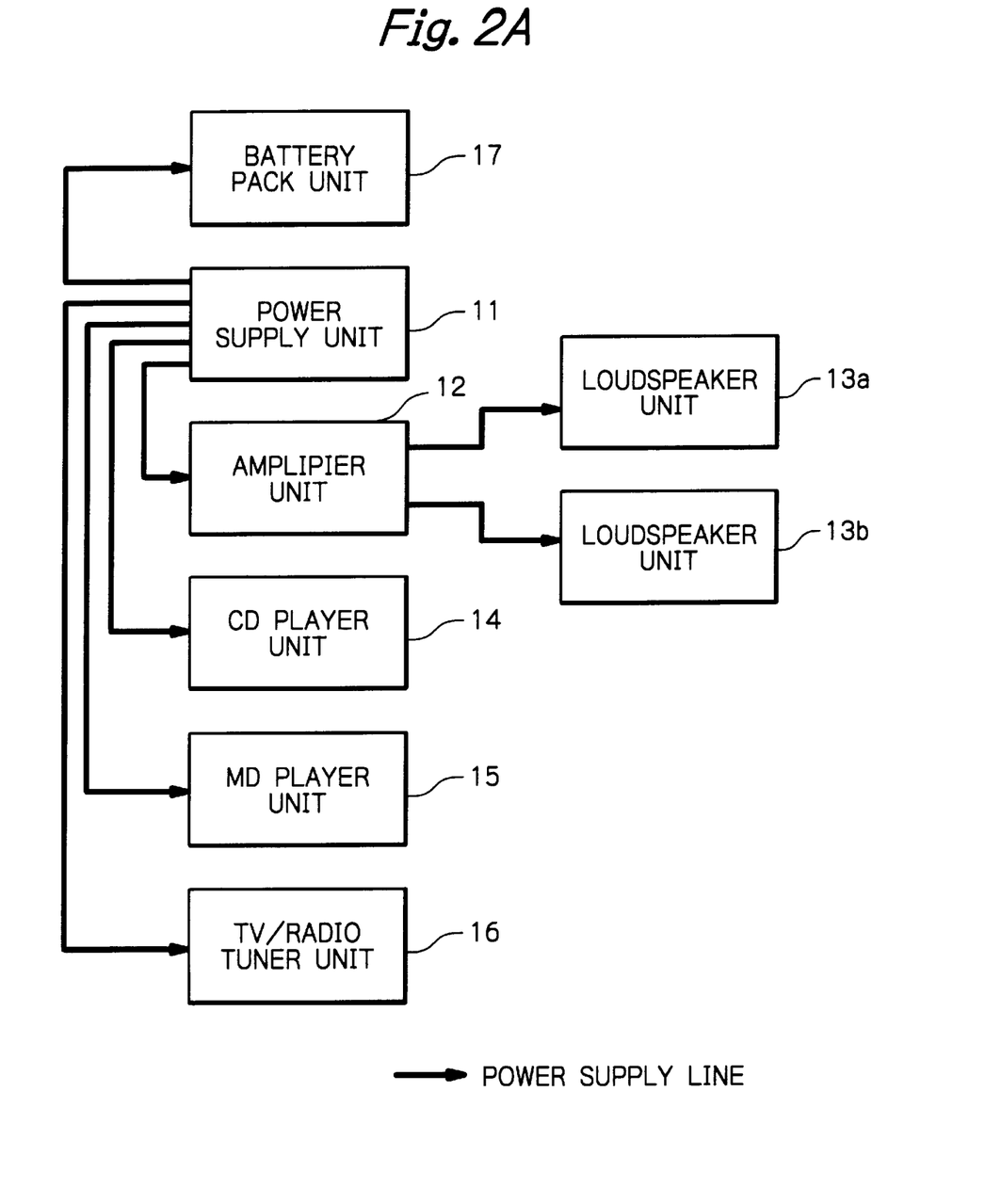
FIGS. 2A and 2B are block circuit diagrams of the apparatus of FIG. 1 where power supply lines are arranged.
Figure 2B:
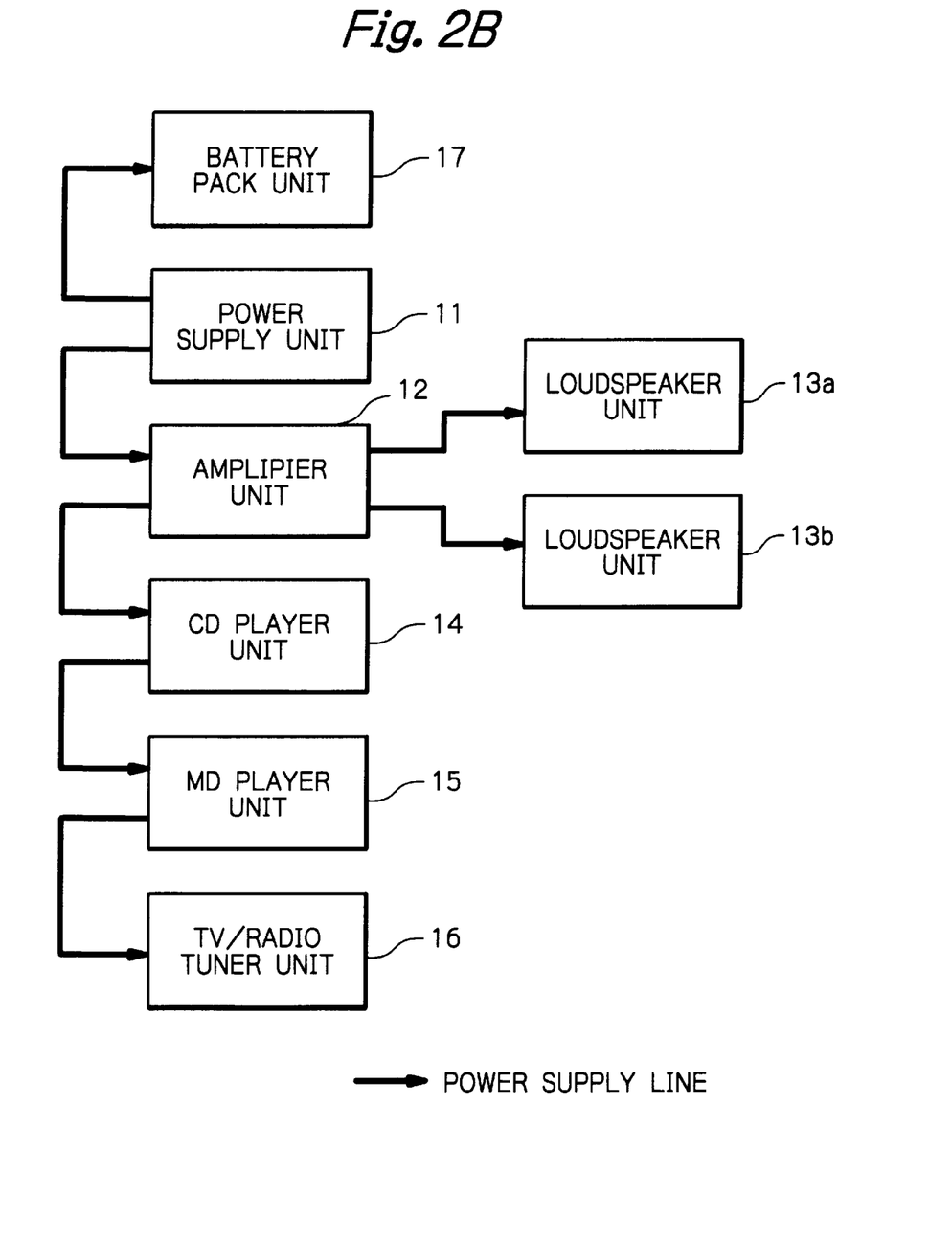

As illustrated in FIG. 2A, since the power supply unit 11 has a capacity necessary for driving the units connected to it simultaneously, the power supply unit 11 can be connected by power supply lines in parallel to all the units. Also, as illustrated in FIG. 2B, since each of the units is provided with two power supply connectors, or a power input connector and a power output connector, the units may alternatively be connected by power supply lines in series to the upstream power supply unit 11 depending on the available space in the apparatus and the layout of the units.

Since all the units are driven by the DC voltage 12 V, the stereophonic audio system of FIG. 1 can be used as a car audio system if power is supplied from the battery of the car. Since a stereophonic audio system of FIG. 1 and a car audio system normally includes a number of units that are common to both of them, such units may be interchangeably combined for them.

The power supply unit 11 is adapted to electrically charge a 12 V lithium ion dry cell contained in the battery pack unit 17. More specifically, it can automatically charge the dry cell with electricity by connecting an adaptor arranged on an upper area of the power supply unit 11 to the battery pack unit 17. The lithium ion dry cell contained in the battery pack unit 17 may be replaced by a nickel-cadmium dry cell or a nickel-hydrogen dry cell. The battery pack unit 17 id provided with connectors that can be connected to the power supply connectors of each unit so that it may be connected to each of the units. Since each of the units is provided with common power supply connectors and designed to be driven by a common power supply voltage of 12 V, the battery pack unit 17 can be shared by all the units. However, since the units consume power at different rates, the battery pack unit 17 contains three different packs of 5 W, 10 W and 30 W that may be selectively used depending on the power consumption rate of each unit connected to it.

Figure 3:
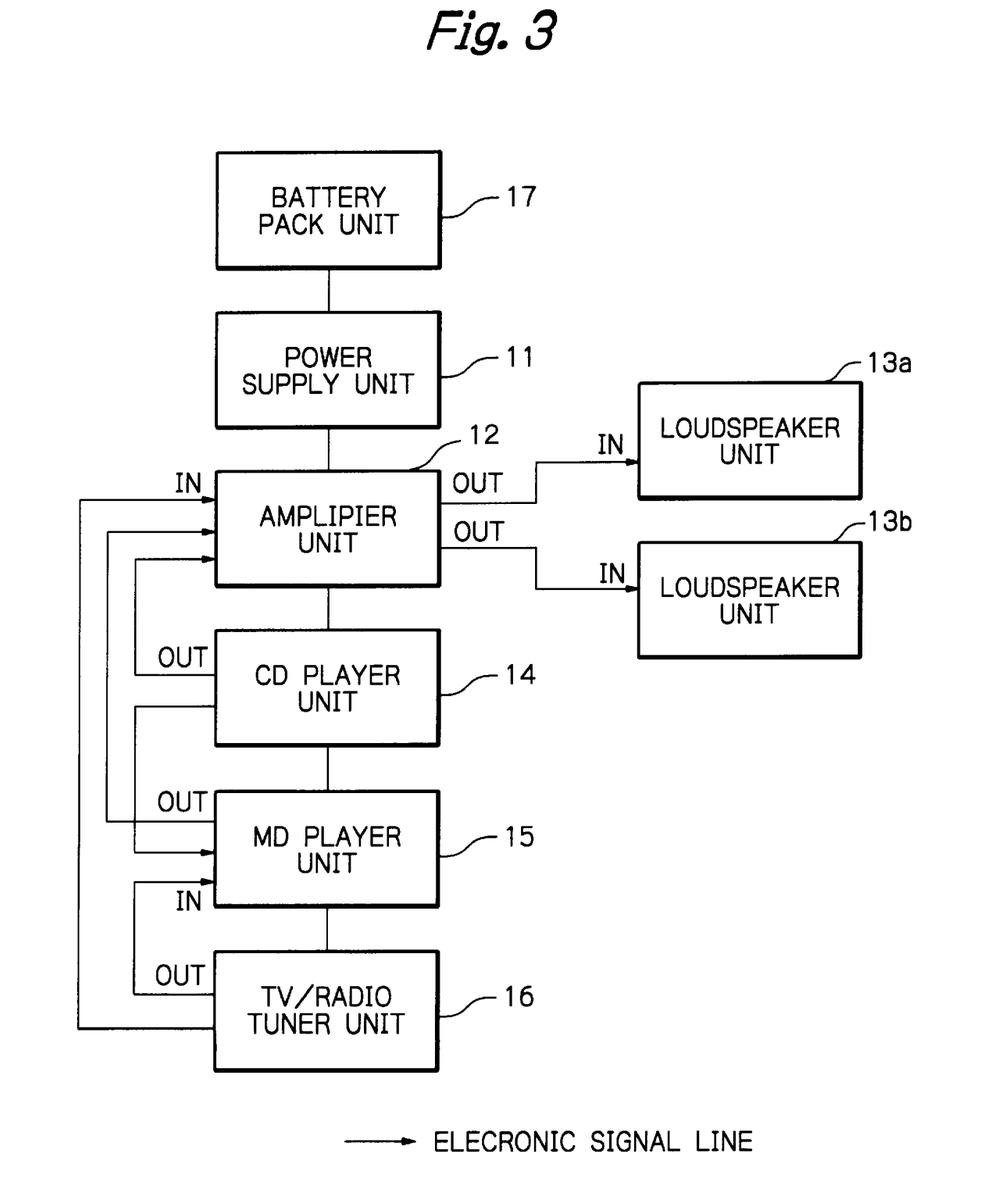
FIG. 3 is a block circuit diagram of the apparatus of FIG. 1 where electric signal lines are arranged.

In the apparatus of FIG. 1, electric signal lines are arranged as illustrated in FIG. 3. Electric signals are transmitted and received by the units by means of infrared rays, although an optical communication system may be used to replace the infrared-ray communication system. A commercially available infrared-ray communication device may be used for signal transmission/reception utilizing infrared rays. Electric signals that can be transmitted and received in FIG. 3 include left right audio signals, image signals for television and video and signals for personal computers.

The MD player unit 15 has mounted thereon an infrared-ray transmitter/receiver because it can record and reproduce sounds. The CD player unit 14 and the TV/radio tuner unit 16 are provided only with an infrared-ray transmitter. On the other hand, the amplifier unit 12 is provided only with an infrared-ray receiver.

Figure 4:
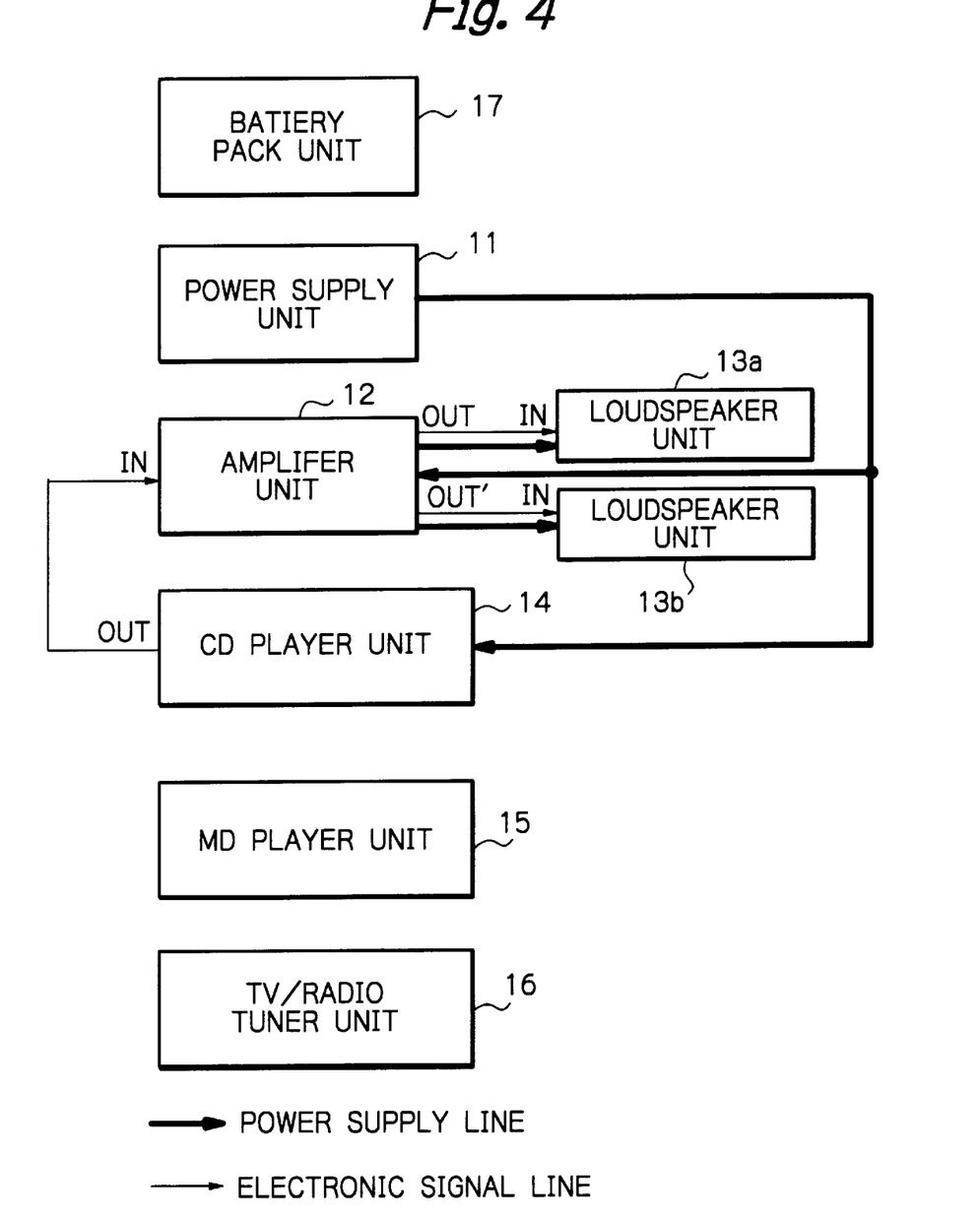
FIG. 4 is a block circuit diagram of the apparatus of FIG. 1 where power supply lines and electric signal lines are arranged for driving a CD.

When a CD is driven, power supply lines and electric signal lines are arranged as illustrated in FIG. 4. The CD can be driven by connecting only the CD player unit 14 and the amplifier unit 12 to the power supply unit 11. Thus, all the units except the two units 12 and 14 may be left unenergized to save power unlike conventional stereophonic audio systems where all the functional components and units are energized for driving a CD. The audio signal reproduced by the CD player unit 14 is transmitted to the amplifier unit 12 by infrared-ray communication and amplified to a selected power level before the original sound is produced from the loudspeaker units 13a and 13b. The use of infrared-ray communication for the transmission of audio signals allows a wireless inter-unit electric connection. This means that the layout of the units of FIG. 1 can be modified freely so ling as infrared-ray communication can be established among them. Additionally, since no complex operation of cable connection is required for FIG. 4 unlike conventional stereophonic audio systems, the layout of the units may be modified and any of the units may be replaced for repair or waste disposal in a simple manner. When the CD player unit 14 is connected to the battery pack unit 17 and a stereophonic headphone, it can be used as a portable CD player.

Figure 5:
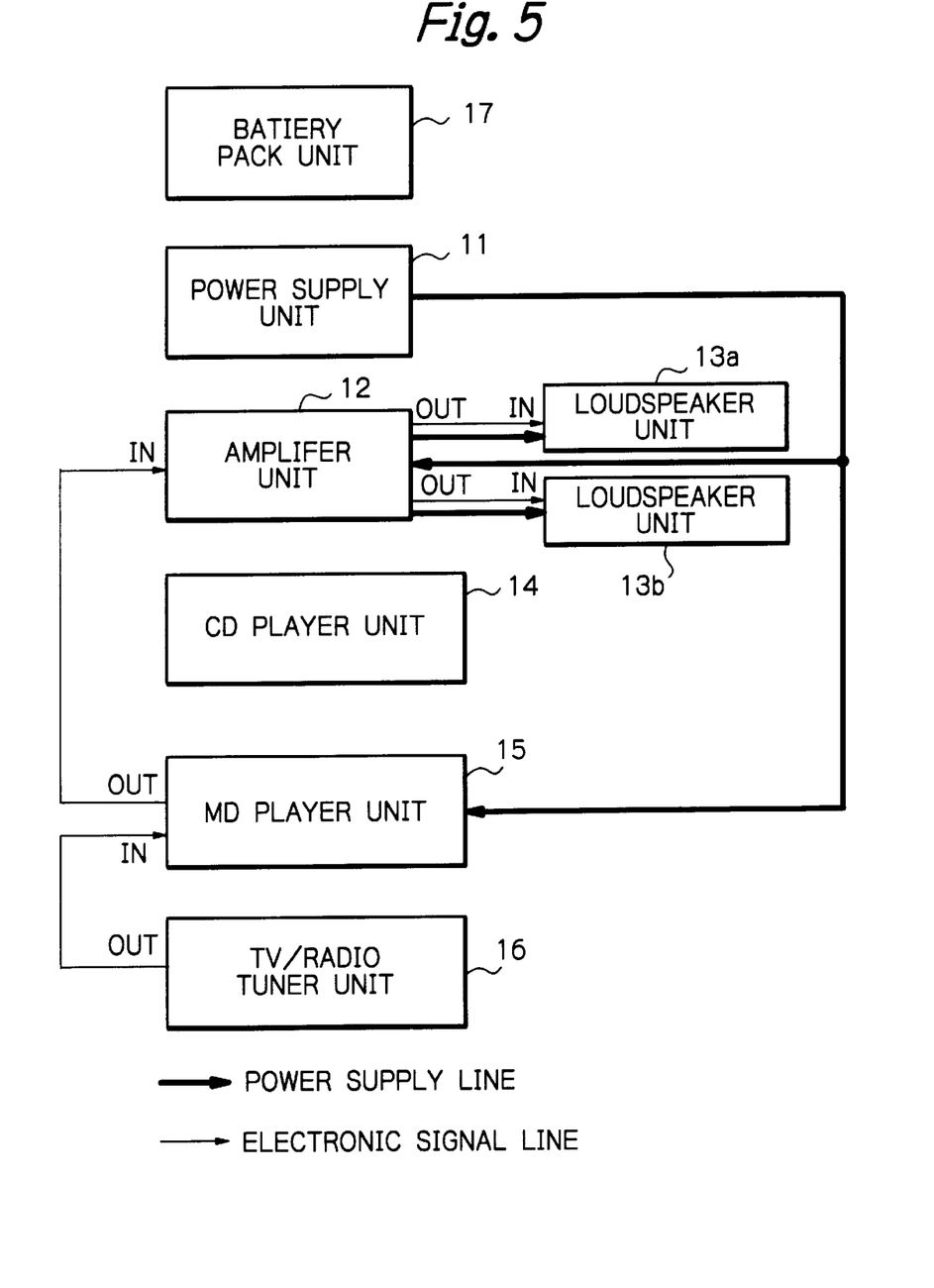
FIG. 5 is a block circuit diagram of the apparatus of FIG. 1 where power supply lines and electric signal lines are arranged for recording a radio program on an MD.
Figure 6A:
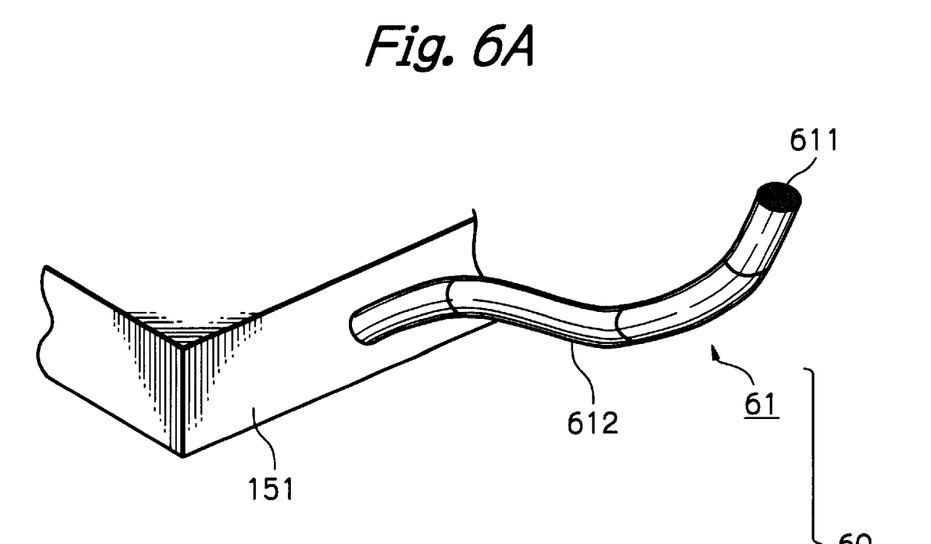
FIG. 6A is a perspective view of the transmitter mounted on the MD player unit 15.
Figure 6B:
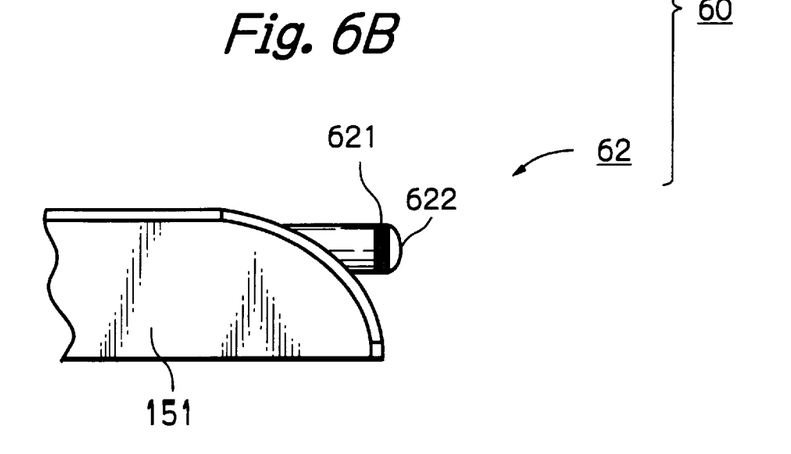
FIG. 6B is a cross-sectional view of the receiver mounted on the MD player unit 15.

When a radio program is recorded on an MD, power supply lines and electric signal lines are arranged as illustrated in FIG. 5. The power supply unit 11 has to be connected to at least the MD player unit 15, the amplifier unit 12 and the TV/radio tuner unit 16. The system may be used as a portable MD player or a portable radio receiving set when the MD player unit 15 and the TV/radio tuner unit 16 are connected to the battery pack unit 17 and a stereophonic headphone. The radio transmission signal received by the TV/radio tuner unit 16 is transmitted to and recorded by the MD player unit 15 as an audio signal by infrared-ray communication. At the same time, the audio signal transmitted to the MD player unit 15 by the infrared-ray communication is also sent to the amplifier unit 12 and amplified to a selected power level before the original sound is produced from the loudspeaker units 13a and 13b. However, note that the audio signal from the TV/radio tuner unit 16 and the audio signal from the MD player unit 15 can interfere with each other because they are transmitted simultaneously. In order to avoid such interference, an infrared-ray transmitter/receiver 60 as illustrated in FIGS. 6A and 6B having a desired level of directivity is used for each of the units. The infrared-ray transmitter/receiver 60 can transmit and receive infrared rays within a limited area that can be defined or selected. Any signal interference can be prevented easily by using the infrared-ray transmitter/receiver 60 and directing it to the transmitter/receiver of each unit to be connected to it.

The infrared-ray transmitter/receiver 60 is mounted on the MD play unit 15 as illustrated in FIGS. 6A and 6B. That is, the infrared-ray transmitter/receiver 60 is constructed by a transmitter 61, a receiver 62 and a circuit board (not shown) to be used for controlling the operation of the transmitter 61 and the receiver 62.

As illustrated in FIG. 6A, the transmitter 61 has a light emitting diode (LED) 611 for emitting infrared rays. Two to four light emitting diodes 611 may be used when the emitted infrared rays have to travel over a long distance for signal transmission/reception. The LED 611 can emit infrared rays for signal transmission within a radiation angle of about 10° from the front end. The distance over which an infrared ray can travel from the transmisster 61 to the receiver 62 is 5 m at most. For signal transmission, the LED 611 is fitted to the front end of a flexible arm 612 connected to a cabinet 151 of the MD player unit 15, so that the infrared rays can be oriented to a desired direction because the infrared rays transmitted from the transmitter 61 show an enhanced degree of directivity. The flexible arm 612 is made of metal and is about 10 cm long. It can be freely bent to select a desired direction for emitting infrared rays. A signal receiving unit can be selected by directing the transmitter 611 to the receiver 62 of the target unit so that the LED 611 fitted to the front end of the flexible arm 612 operates as the selector of a stereophonic audio system. The flexible arm 612 connecting the cabinet 141 and the LED 611 may be replaced by a universal joint.

As illustrated in FIG. 6B, the receiver 62 has phototrasistor 621 for receiving infrared rays. A lens 622 is arranged on the from surface of the phototransistor 621 to increase the angular scope of receiving infrared rays. With the use of the lens 622, infrared rays can be received within a horizontal angular scope of about 40° and a vertical angular scope of about 15°. As in the case of the transmitter 61, the phototransistor 621 may be fitted to the front end of the flexible arm 612 or a universal joint for the receiver 62. Each of the remaining units is also provided with a transmitter and a receiver similar to those described above.

Figure 7:
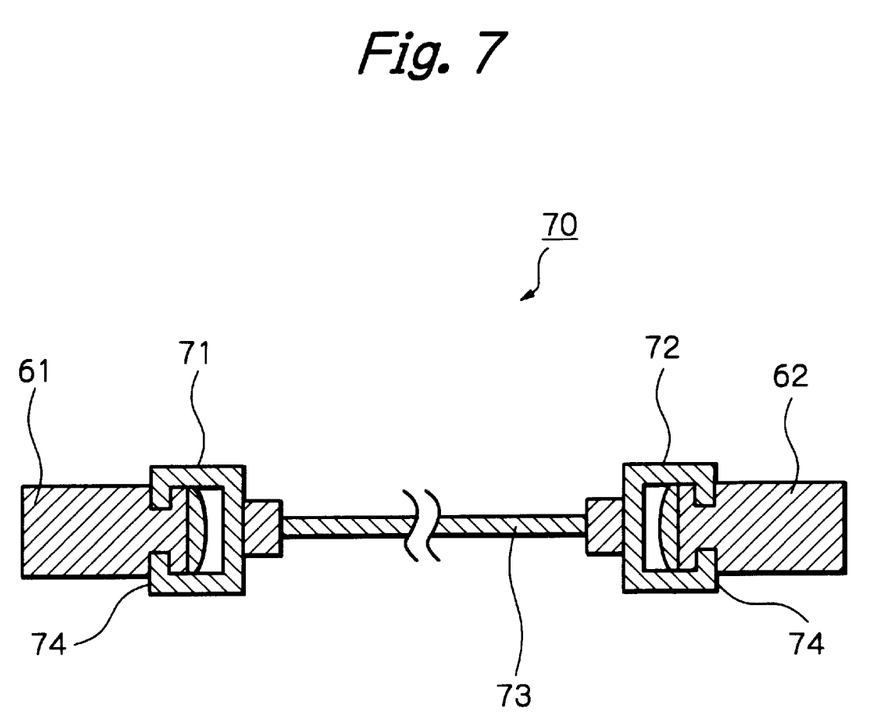
FIG. 7 is a cross-sectional view illustrating a connector cable used in the apparatus of FIG. 1.

A connector cable 70 constructed by an optical fiber as illustrated in FIG. 7 can be used when a plurality of signals are transmitted simultaneously and the use of the infrared-ray transmitter/receiver 60 of FIGS. 6A and 6B may not satisfactorily eliminate possible signal interference. The connector cable 70 is provided with connectors 71 and 72 at the opposite ends of an optical fiber 73. The connector 71 is adapted to be connected to the transmitter 61 of the infrared-ray transmitter/receiver 60. It can be plugged in and out without requiring any specific tool. The connector 72 is adapted to be connected to the receiver 62 of the infrared-ray transmitter/receiver 60. It can also be plugged in and out without requiring any specific tool. Any undesired scattering and reflection of infrared rays can be avoided by using such a connector cable 70 to connect the selected units for audio signal transmission/reception.

The optical fiber 73 is about 30 cm long and is coated with resin material. However, the optical fiber 73 may not be specifically coated with resin because it is short. The connector 71 may be connected to the LED 611 of the transmitter 61, whereas the connector 72 may be connected to the phototransistor 621 of the receiver 62. Each of the connectors 71 and 72 is provided with a click 74 for preventing it from being unintentionally released from the LED 611 or the phototransistor 621, whichever appropriate, on which the connector is simply placed. The connectors 71 and 72 differ from each other remarkably in terms of profile to reflect the remarkable difference between the LED 611 and the phototransistor 621 also in terms of profile. The connectors 71 and 72 may be identical to each other if the LED 611 and the phototransistor 621 have the identical profile.

The infrared-ray transmitter/receiver 60 can transmit and receive left and right audio signals and a television or video image signal by means of infrared rays. In other words, these signals can be transmitted or received simultaneously by means of a single connector cable of FIG. 7. With the prior art stereophonic audio system, three cables are needed to transmit or receive left and right audio signals and a television or video image signal. To the contrary, the apparatus of FIG. 1 uses only the single connector cable of FIG. 7 to transmit and receive those signals. Thus, since no complex operation of cable connection is required unlike the prior art stereophonic audio system, the layout of the units may be modified and any of the units may be replaced for repair or waste disposal in a simple manner.

Figure 8:
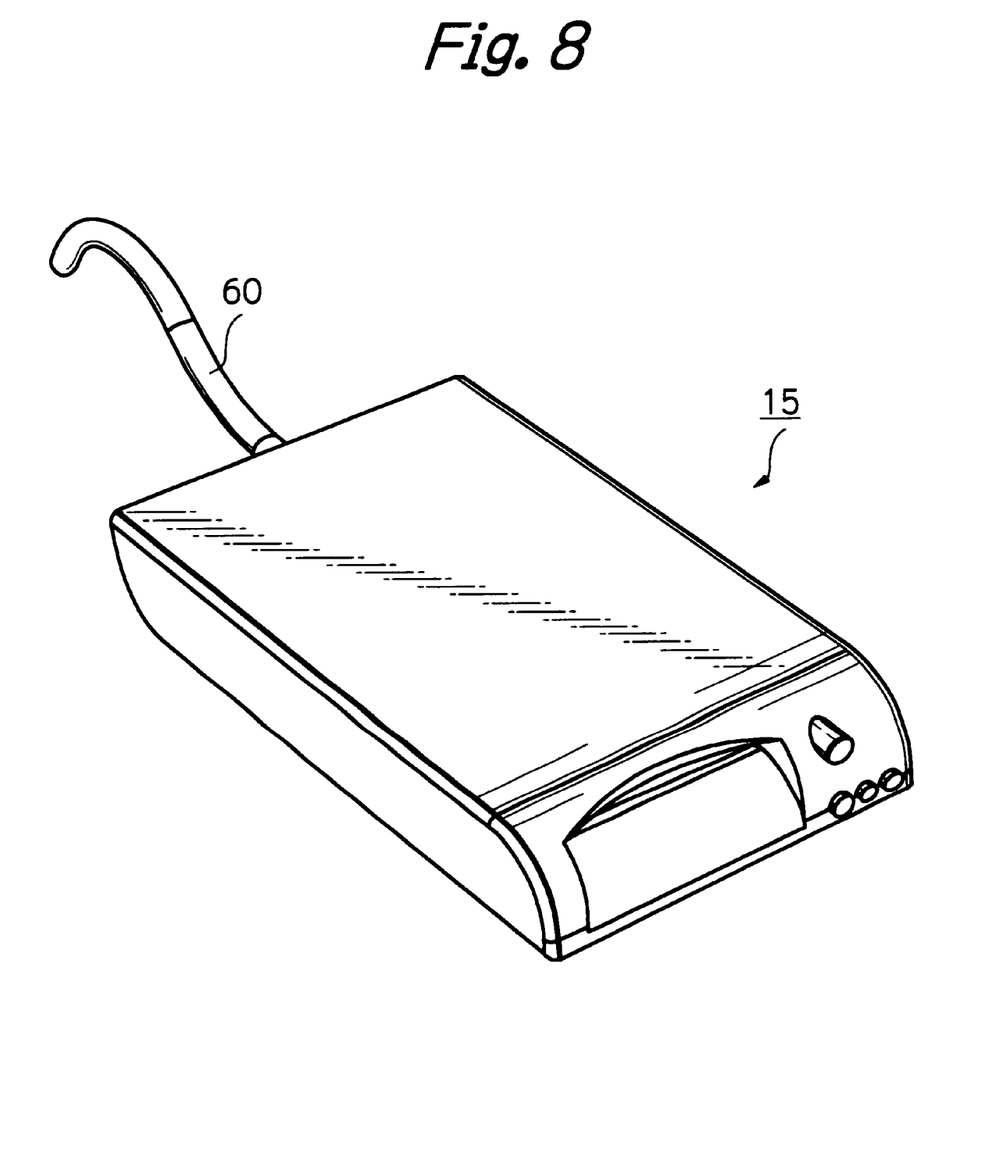
FIG. 8 is a perspective view of the MD player unit of FIG. 1.
Figure 9:
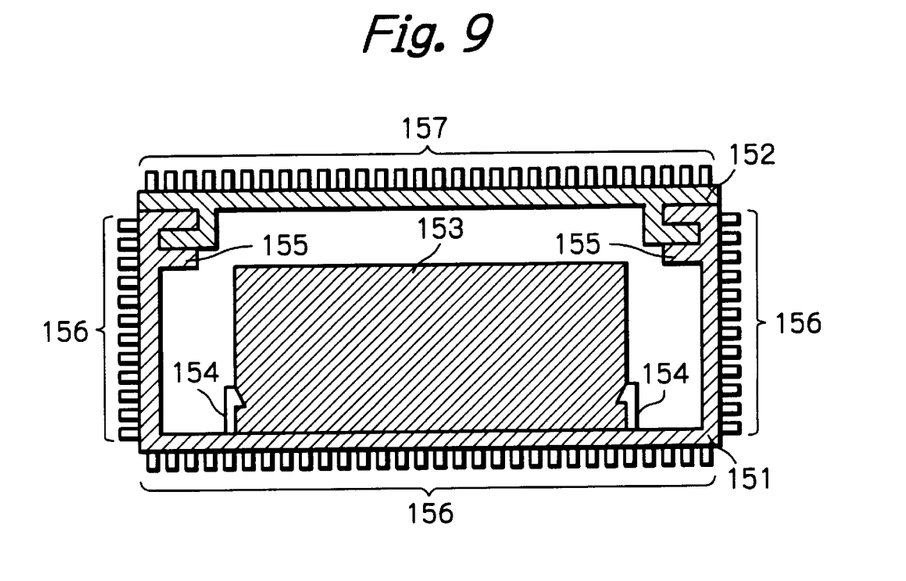
FIG. 9 is a cross-sectional view of the MD player unit of FIG. 8.

FIG. 8 is a perspective view of the MD player unit 15 of FIG. 1, and FIG. 9 is a cross-sectional view of the MD player unit 15 of FIG. 8.

As illustrated in FIGS. 8 and 9, the MD player unit 15 includes a cabinet 151 made of recyclable plastic acrylonitrile-butadiene-styrene (ABS) resin, a lid 152 also made of recyclable plastic ABS resin and an MD functional component 153. The ABS resin used for the cabinet 151 and the lid 152 may be replaced by some other plastic material such as polycarbonate or polystyrene, or metal such as aluminum or a magnesium alloy.

The functional component 153 is rigidly secured to the cabinet 151 by means of snap fit connectors 154 so that it may be removed easily for repairing, up-grading, recycling, reusing and disassambling for waste disposal. The snap fit connectors 154 may be replaced by screws. The lid 152 is inserted into a slide guide 155 arranged at an inner upper portion of the cabinet 151. The lid 152 inserted into the slide guide 155 can be removed from the cabinet 151 easily without using any tool as it can be moved back and forth relative to the cabinet 151. The functional component 153 rigidly secured to the cabinet 151 can also be removed from the unit easily and simply by sliding the lid 152 away from the cabinet 151. Once the functional component 153 is removed, both the cabinet 151 and the lid 152 can be recycled as ABS resin without problem because they do not carry any parts made of material other than ABS resin. Note that all the other units of FIG. 1 except for the loudspeaker units 13a and 13b have a configuration similar to that of the MD player unit 15, although the cabinets 151 and the lids 152 of the units may vary from each other because the functional components 153 mounted in the cabinets 151 dimensionally vary from each other.

The cabinet 151 and the lid 152 of each unit are provided with other connectors 156 and 157 for rigidly holding the other units. For example, the cabinet 51 of the MD player unit 15 is provided with anchor connectors 156 on the bottom and on the entire left and right lateral surfaces, while the lid 152 of the MD player unit 15 is provided on the entire surface with an anchor connector 157.

Note that, as illustrated in FIG. 8, the cabinet 151 of the MD player unit 15 is additionally provided on the front side with operation buttons and control switches and the rear side with an infrared-ray transmitter/receiver 60 and, therefore, no other connectors are arranged there.

Figure 10:
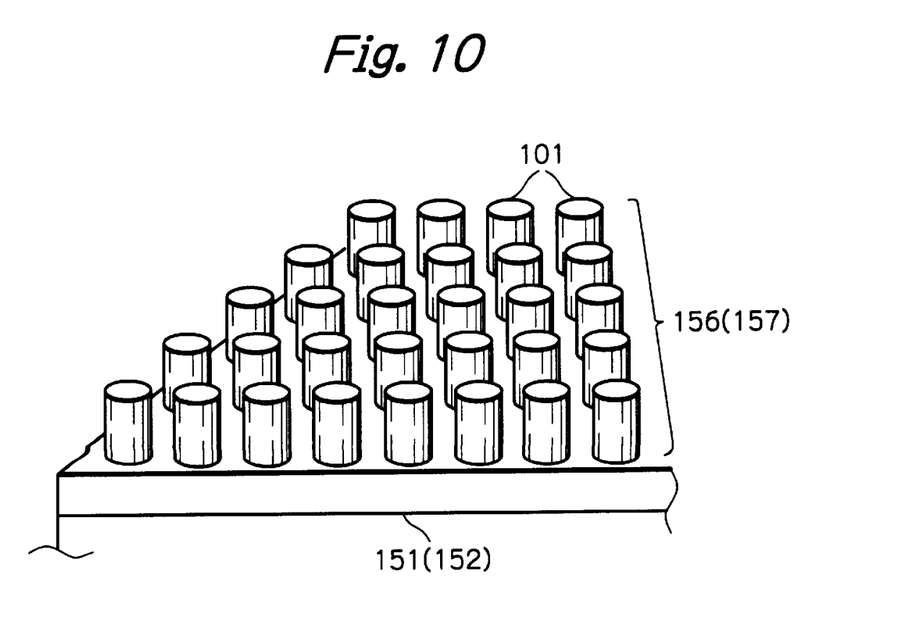
FIG. 10 is a perspective view of the anchor connector of FIG. 9.

As illustrated in FIG. 10, each of the anchor connectors 156 and 157 is constructed by an array of cylindrical projections 101, each having a diameter of 2.5 mm and a height of 3 mm, arranged at regular intervals of about 3.53 mm. Each of the cylindrical projections 101 is tapered toward the top thereof, and the diameter at the top is smaller than the diameter at the bottom by about 0.4 mm. For connecting and anchoring two units relative to each other, the projections 101 of one of the units to be anchored are inserted into the gaps of the projections 101 of the other unit so that they may be frictionally held to each other. The anchor connectors 156 and 157 are made of ABS resin as in the case of the cabinets 151 and the lids 152. The anchor connectors 156 and 157 may alternatively be made of hard rubber or silicon resin that can elastically be deformed with ease so that the anchoring effect of the anchor connectors 156 and 157 may be regulated. The profile of the projections 101 may be modified by scraping the upper edge of the cylinder, or the cylindrical projections 101 may be replaced by spherical or wedge-like projections. When anchoring two units by means of anchor connectors of the units are pressed against each other for mutual engagement after selecting a location and relative directions for the units. If the anchoring unit has additional space, it can anchor a plurality of units. The connected units may be separated without difficulty because their anchor connectors can be disengaged from each other without using any tool.

Figure 11:
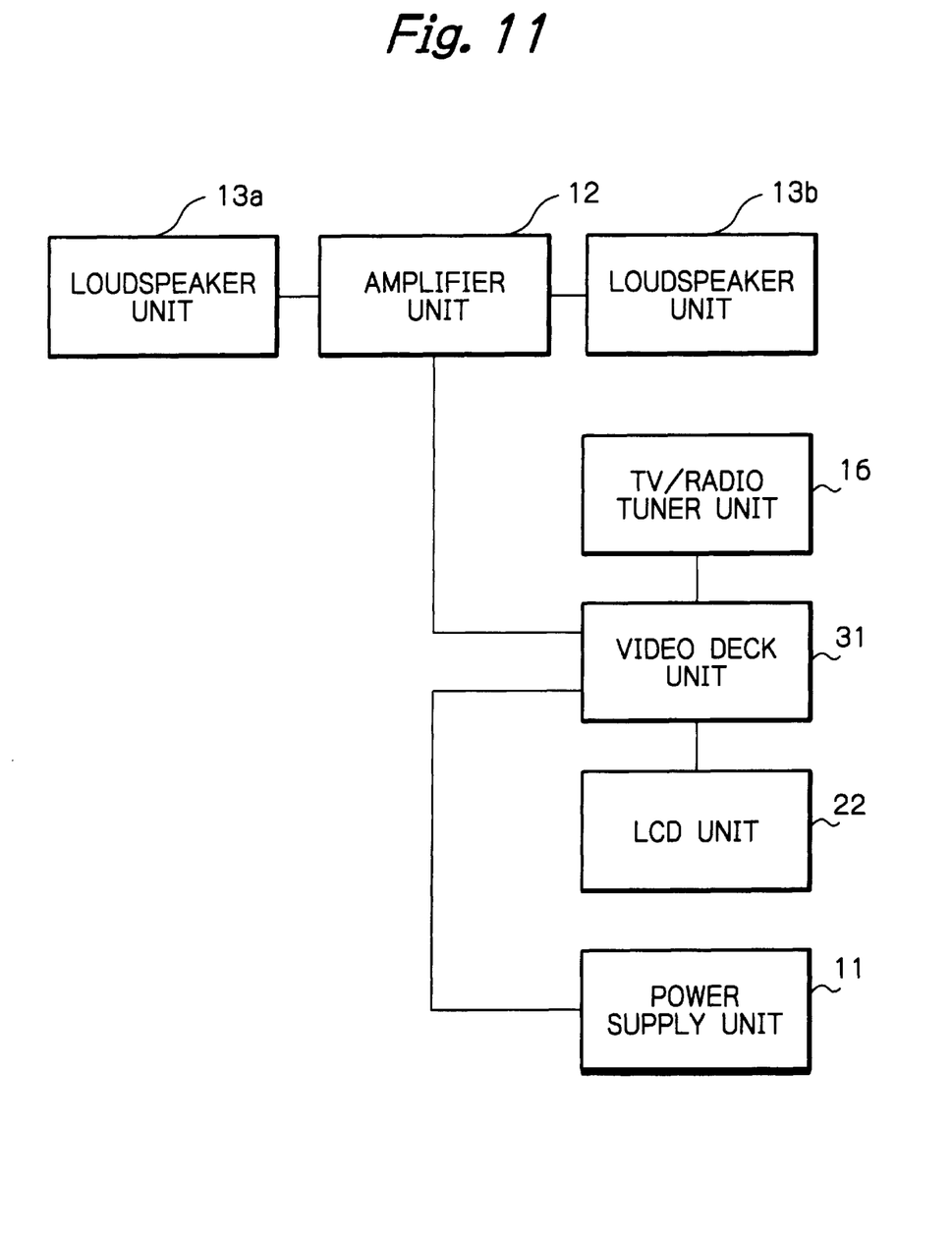
FIG. 11 is a block circuit diagram illustrating a second embodiment of the compact electronic apparatus according to the present invention.

In FIG. 11, which illustrates a second embodiment of the present invention, a personal computer is illustrated. The personal computer of FIG. 11 includes a power supply unit 11, an amplifier unit 12, loudspeaker units 13a and 13b, a CD player unit 14, a control unit 21 and an LCD unit 22. If the large capacity battery pack unit 17 of FIG. 1 is connected to the control unit 21 and the remaining units are connected to the control unit 21 and the remaining units are connected in series to the control unit 21, the personal computer. The personal computer of FIG. 11 can also be used in a car when it is connected to the car battery for power. It can also be used as a car navigation system when a global positioning system (GPS) antenna is connected thereto.

The control unit 21 includes a motherboard, a CPU, a memory, a hard disc, a hard disc drive and the like. The CPU is a Pentium 200 megahertz available from Intel. The motherboard is a commercially available board that is adapted to carry a Pentium 200 megahertz of Intel. The memory can store 64 megabytes altogether. The hard disc is a commercially available disc having a memory capacity of 2 gigabytes.

The LCD unit 22 includes a high-resolution type 14-inch TFT color liquid crystal display panel providing a wide viewing angle. It can receive two input signals of an analog RGB signal and a video signal simultaneously for display so that it can be used as a monitor of the personal computer and also a monitor for a television set.

Figure 12:
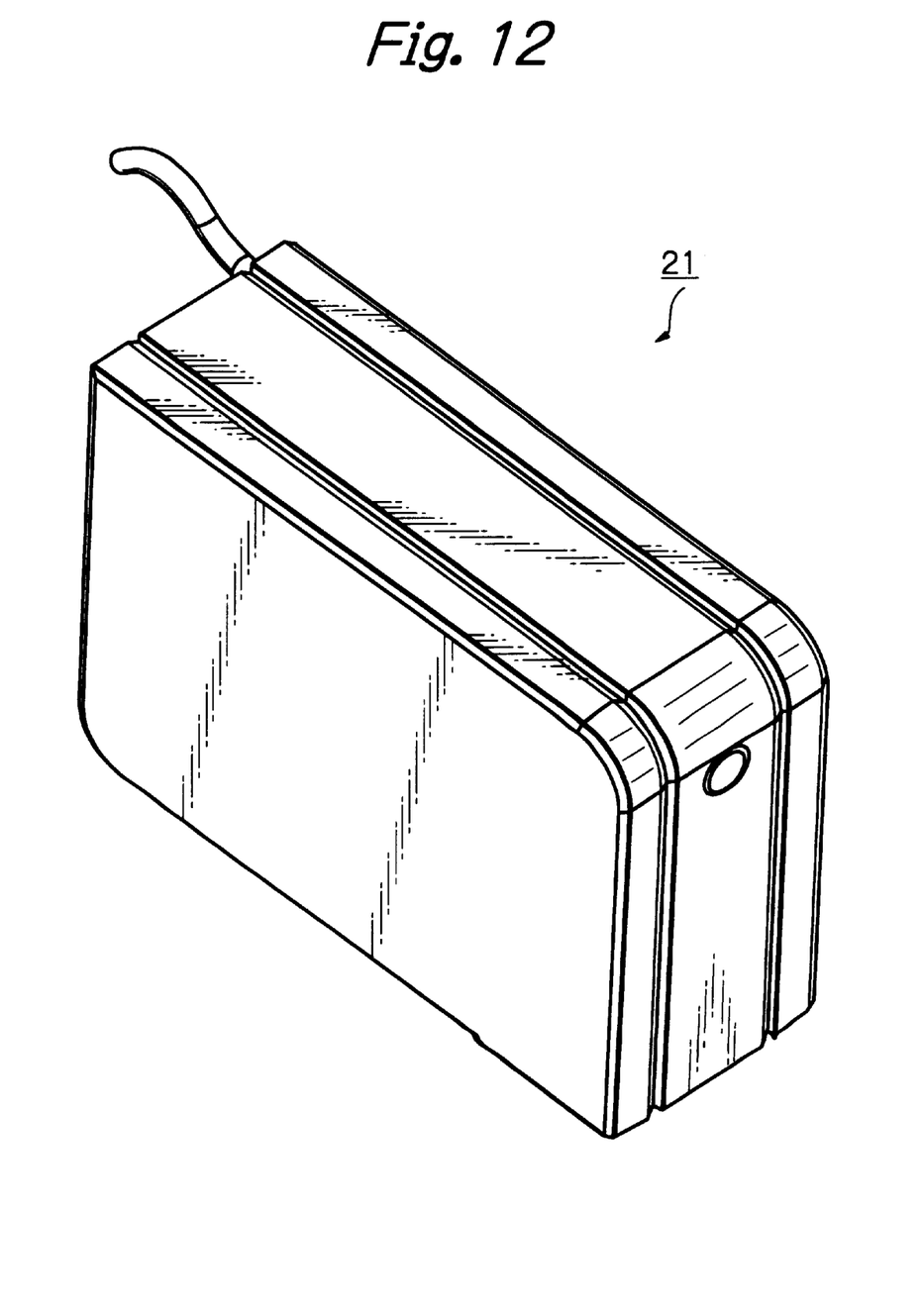
FIG. 12 is a perspective view of the control unit of FIG. 11.

As illustrated in FIG. 12, the control unit 21 has the same configuration as the MD player unit 5 or the like in the first embodiment. Also, the LCD unit 22 has a similar configuration. Each of the control unit 21 and the LCD unit 22 is provided with an infrared-ray transmitter/receiver and an anchor connector as in the first embodiment.

Thus, the power supply unit 11, the amplifier unit 12, the loadspeaker units 13a and 13b, and the CD player unit 14 of the second embodiment may be used commonly for the stereophonic audio system of the first embodiment as they have common functional components.

Figure 13:
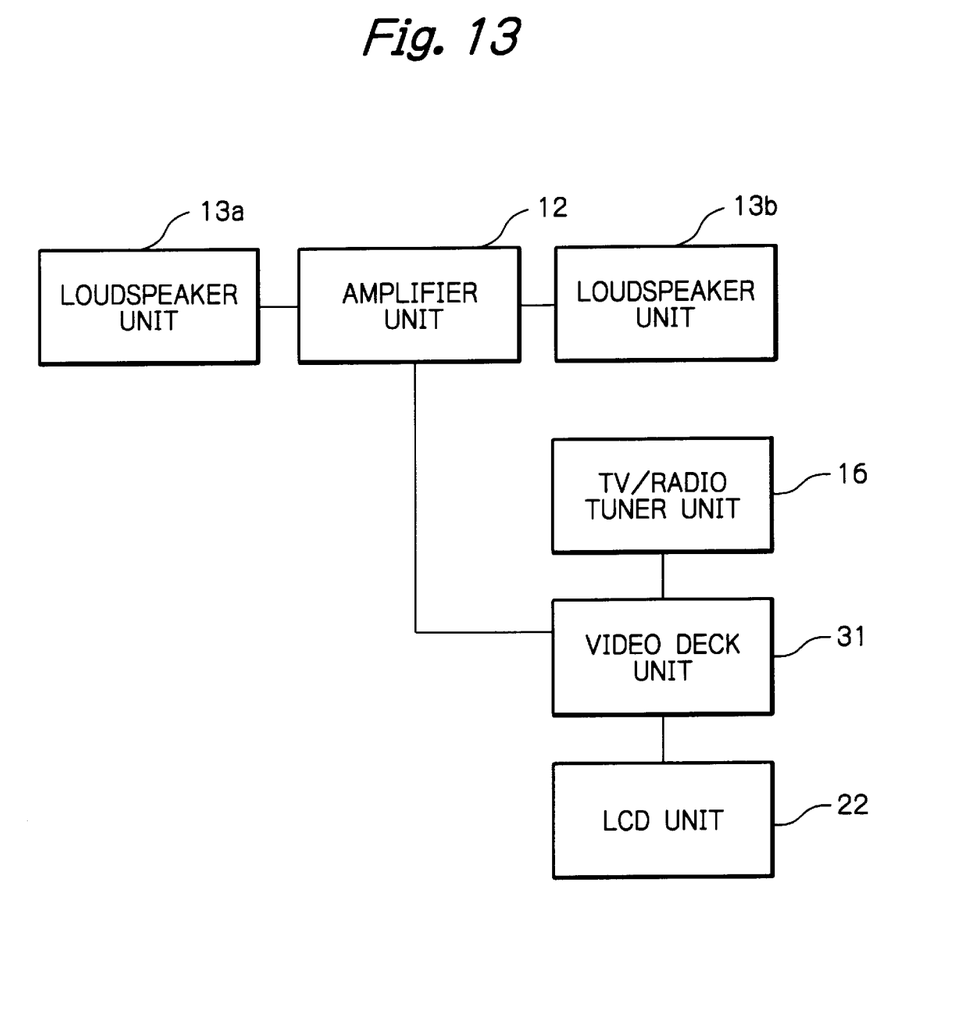
FIG. 13 is a block circuit diagram illustrating a third embodiment of the compact electronic apparatus according to the present invention.

In FIG. 13, which illustrates a third embodiment of the present invention, a television set is illustrated. The television set of FIG. 13 includes a power supply unit 11, an amplifier unit 12, loadspeaker units 13a and 13b, a TV/radio tuner unit 16, an LCD unit 22 and a video deck unit 31. If the video deck unit 31 and the LCD unit 22 are connected to a battery pack, the apparatus of FIG. 13 can be used as a portable television set or a portable video camera. It can also be used as a car television set when supplied with power from a car battery.

The video deck unit 31 has the same configuration as the MD player unit 15 of the first embodiment and the control unit 21 of the third embodiment. The video deck unit 31 is provided with an infrared-ray transmitter/receiver and an anchor connector as in the first embodiment.

Thus, the power supply unit 11, the amplifier unit 12, the loudspeaker units 13a and 13b and the TV/radio tuner 16 of the third embodiment may be used commonly for the stereophonic audio system of the first embodiment and the personal computer of the second embodiment as they have common functional components. Also, the LCD unit 22 of the third embodiment may be used commonly for the personal computer of the second embodiment as they have common functional components.

Figure 14:
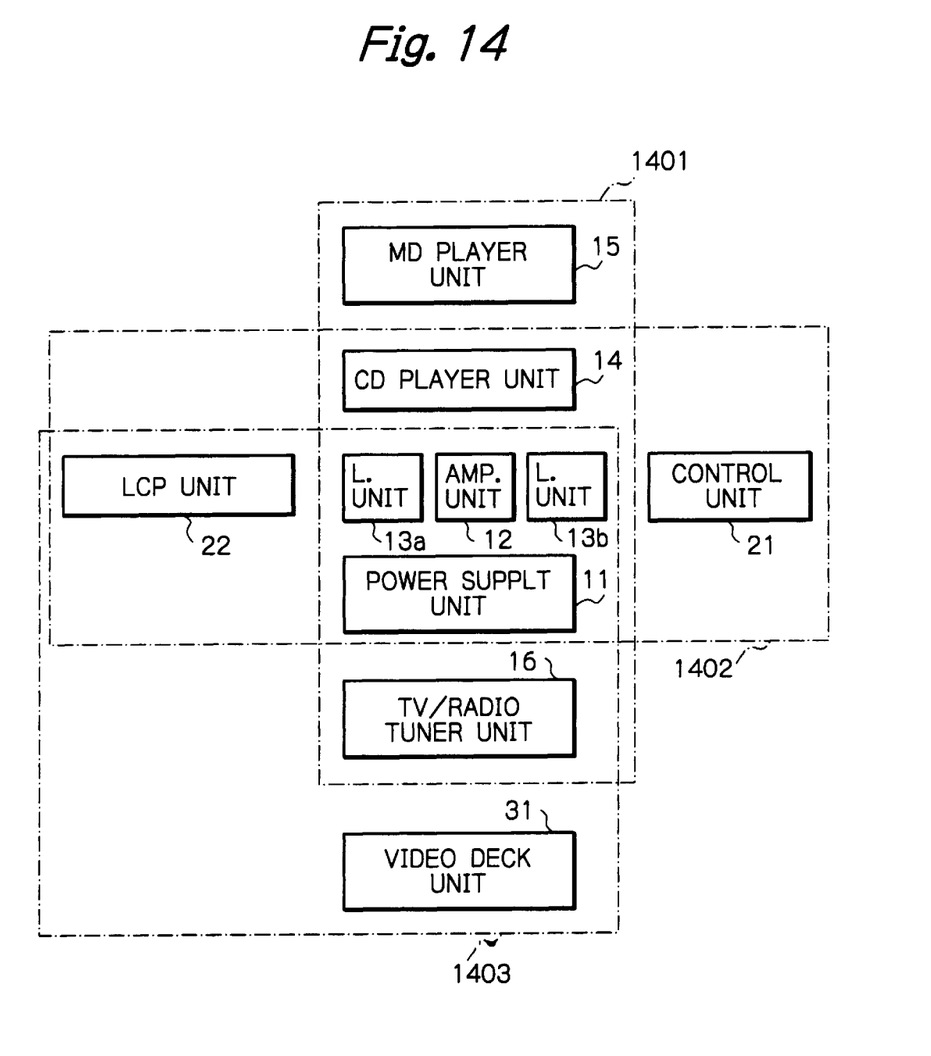
FIG. 14 is a block circuit diagram illustrating a fourth embodiment of the compact electronic apparatus according to the present invention.

In FIG. 14, which illustrates a fourth embodiment of the present invention, as a stereophonic audio system 1401 of the first embodiment a personal computer 1402 of the second embodiment and a television set 1403 of the third embodiment are combined with each other. Since the units mounted with common functional components can be connected easily with each other, they can be commonly shared by these electronic apparatuses 1401, 1402 and 1403. For example, Since all the electronic apparatuses need the power supply unit 11, the amplifier unit 12, and the loudspeaker units 13a and 13b, they can be commonly shared by these apparatuses 1401, 1402 and 1403. For example, the CD player unit 14 may be shared by the stereophonic audio system 1401 and the personal computer 1402. Also, the single LCD unit 22 may be shared by the personal computer 1402 and the television set 1403.

Thus, in the fourth embodiment, a plurality of compact electronic apparatus can be realized for daily use with a minimal number of functional components through a combined use of functionally separated units.

As explained hereinabove, according to the present invention, since each of the units has a circuit board and a cabinet for housing functional components, when replacing circuit components, circuit board and/or drives that are malfunctioning or replacing them with revised ones or when disassambling the product for waste disposal, only the related unit or units may have to be removed, leaving the remaining units intact. As a result, the entire apparatus will be able to enjoy a prolonged service life and the apparatus can be functionally extended simply by adding one or more than one units to further improve the service life of the apparatus.

Additionally, a plurality of compact electronic apparatuses can be realized for daily use with a minimal number of functional components through a shared use of common units.

Because a plurality of compact electronic apparatuses can be realized for daily use through a shared use of a minimal number of units, the overall dimensions of the apparatuses can be reduced.

Further, units can be anchored an connected to each other at freely selected locations to allow an enhanced degree of freedom of layout, while minimizing the required space an improving the service life of the apparatus.

Still additionally, only the necessary units have to be electrically powered to activate any of the plurality of electronic apparatuses for daily use to save power to a considerable extent.

Furthermore, the units may be connected by means of infrared transmitting/receiving devices to eliminate the use of cables an cords and save the space necessary for them. As a result, the apparatus can further save space and reduce the load on the environment.

Finally, since each unit can be dimensioned to house the related functional components to minimize the overall space requirement of the electronic apparatus, the apparatus can further save space.

What is claimed is:

1. A compact electronic apparatus comprising a plurality of individual units each having a single function and having a functional component removably secured to its own cabinet, wherein each of said units has at least one of an input connector and an output connector for electric signals, and wherein said input connector comprises an optical receiver, and said output connector comprises an optical transmitter.

2. The compact electric apparatus as set forth in claim 1, wherein said input connector comprises a lens in front of said optical receiver.

3. The compact electric apparatus as set forth in claim 1, wherein said output connector further comprises a flexible arm fixed to said cabinet, for supporting said optical transmitter.

4. The compact electric apparatus as set forth in claim 1, further comprising a plurality of optical connector cables each connected between said output connector and said input connector.

5. The compact electric apparatus as set forth in claim 4, wherein said optical connector cables comprise optical fibers.

6. A compact electronic apparatus comprising a plurality of individual units each having a single function and having a functional component removably secured to its own cabinet, wherein each of said units comprises anchor connectors, formed on said cabinet, for rigidly holding said each of said units with another of said units, and wherein each of said anchor connectors comprises an array of cylindrical projections.

7. A compact electronic apparatus comprising a plurality of individual units each having a single function and having a functional component removably secured to its own cabinet, wherein each of said units comprises a lid inserted into a slide guide arranged at said cabinet, and an anchor connector, formed on said lid, for rigidly holding said each of said units with another of said units, and wherein said anchor connector comprises an array of cylindrical projections.

\* \* \* \* \*